Oct. 23, 1962     J. W. McDUFFIE     3,059,490
CONTROL DEVICE
Filed Jan. 11, 1961
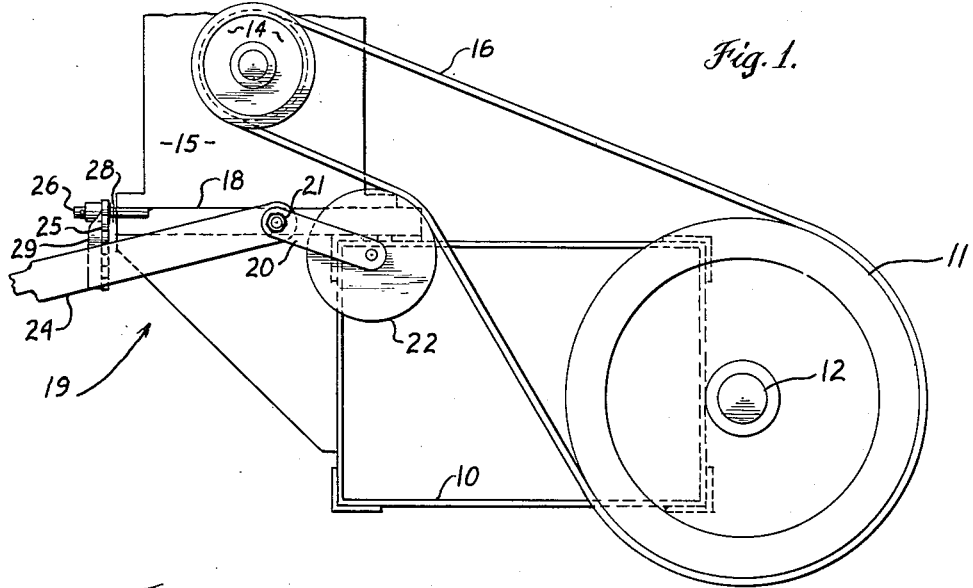
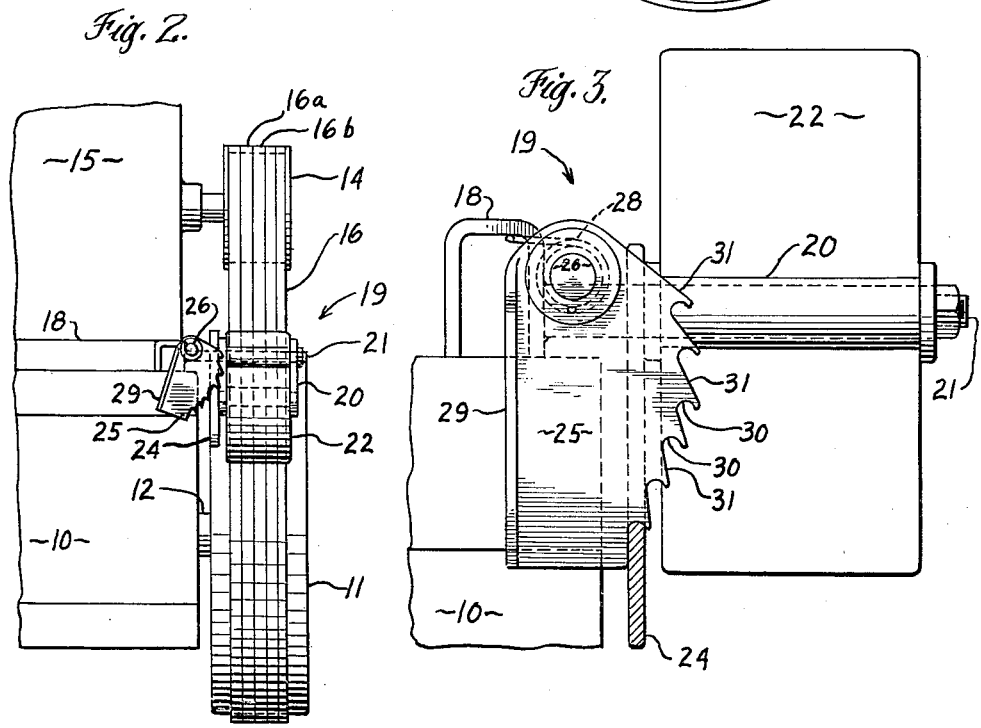
INVENTOR
JAMES W. McDUFFIE
BY Walter V. Wright
AGENT

3,059,490
CONTROL DEVICE
James W. McDuffie, New Holland, Pa., assignor to Sperry Rand Corporation, New Holland, Pa., a corporation of Delaware
Filed Jan. 11, 1961, Ser. No. 82,086
6 Claims. (Cl. 74—242.1)

It is customary in engine driven hay balers to drive the flywheel by an endless belt. The tension of the belt is controlled by a belt engageable roller which is moved into and out of contact with the belt by a manually operable handle.

Heretofore, it has been customary to mount a plate having ratchet teeth thereon in the path of movement of the handle. As the handle is swung in one direction to apply tension to the belt, it is also sprung laterally out of its normal plane of movement to bypass the ratchet teeth. When the position of proper belt tension is achieved, the handle is swung laterally back into its normal plane of movement and into engagement with the nearest ratchet tooth to lock the tensioning roller in position. To release the belt tension, the handle is again swung laterally out of engagement with the teeth and then pivoted in the opposite direction.

This extremely simple mechanism has proven highly successful in operation, and is desirable from the standpoint of low manufacturing cost. The problem, however, arises from the fact that the handle eventually fails in fatigue from being sprung into and out of its normal plane of movement to engage and disengage the ratchet teeth. It is recognized that there are many ways in which this problem may be solved. For example: It has been proposed to simply make the handle of spring steel to extend its service life; break-away mechanisms have been incorporated into the handle; locking pins, or dogs, have been mounted on the handle to engage the ratchet teeth to extend the service life of the handle. While each of these proposals is operable, some result in increased maintenance cost, and all are unsatisfactory from the standpoint of manufacturing cost.

Another problem with some belt tighteners is that only two positions are obtainable, namely: engaged or disengaged. These devices do not accommodate the normal stretch which occurs in a drive belt in the course of its service life. Thus, these tensioning devices become ineffective on a given belt before the full service life of the belt has been utilized.

It is an object of this invention to provide a tensioning device for an endless belt which is effective to provide proper tension in the belt throughout its entire service life.

It is another object of this invention to provide a tensioning device for an endless belt by which the tension of the belt may be varied in small increments.

Another object of this invention is to provide a belt tightener which latches in position automatically when the desired position is obtained.

It is another object of this invention to provide a tensioning device for an endless belt which requires no parts to flexibly yield in the operation thereof, thereby insuring long service life and practically no maintenance cost.

Another object of this invention is to provide a belt tensioning device which is rugged in construction, and inexpensive to manufacture.

Other objects and advantages of this invention will become apparent to those skilled in the art in view of the following description and drawings wherein:

FIG. 1 is a front view of a belt tightener of this invention as applied to the drive belt of an engine mounted hay baler;

FIG. 2 is a side elevation of the belt tightener of FIG. 1 as seen from the left side of FIG. 1; and FIG. 3 is a fragmentary view similar to FIG. 2 but to an enlarged scale.

Referring now to the drawings by numeral of reference, the box-like structure 10 in FIG. 1 represents the bale case of a field hay baler. The numeral 11 indicates a flywheel which is conventionally located at the forward end of the baler and is mounted on a longitudinally extending shaft 12. Power is taken from the shaft 12 to drive the plunger and other moving parts of the baler which are not a part of this invention and are not shown here. The flywheel 11 is driven from the drive pulley 14 of an engine 15 by an endless belt 16. As may be seen in FIG. 2, the width of endless belt 16 may be made up of a plurality of belts having relatively narrow individual widths as seen at 16a and 16b.

Suitable supporting structure 18 is provided on the baler to carry engine 15.

The tension of belt 16 is regulated and maintained by a belt tensioning device indicated generally at 19. The tensioning device comprises a yoke 20 mounted on the baler for pivotal movement about a stud 21 which extends generally transverse to belt 16 and lies in a plane generally parallel to one of the reaches of the belt. A belt engageable roller 22 is rotatably carried by yoke 20. Movement of yoke 20 in a counterclockwise direction, as seen in FIG. 1, about stud 21 moves roller 22 into engagement with belt 16. Clockwise movement of yoke 20 about stud 21, as seen in FIG. 1, moves roller 22 out of engagement with belt 16. In this manner, the tension of belt 16 may be regulated to provide the proper transmission of power from drive pulley 14 to flywheel 11. A handle 24 is welded, or otherwise rigidly attached, to yoke 20 for pivotal movement therewith about stud 21. By applying a downward force to the end of handle 24, the operator moves roller 22 toward and into engagement with belt 16 to increase the tension thereof. A latch member, or plate, 25 is provided to engage handle 24 and thereby lock yoke 20 in position when proper belt tension is achieved.

Latch 25 is mounted for pivotal movement about a stub shaft 26. The axis of stub shaft 26 extends generally parallel to the plane of movement of handle 24. Shaft 26 is carried on the baler in close proximity to handle 24. It will be noted that latch member 25 pivots in a plane generally transverse to the plane of movement of handle 24 and may be moved into and out of the path of movement of the handle. A coil spring 28 carried by shaft 26 biases plate 25 toward handle 24. A flange 29 may be provided on plate 25 to serve as a handle by which the operator may pivot plate 25 out of the path of movement of arm 24 in opposition to the force of spring 28.

Plate 25 is provided with a plurality of handle engageable portions, or notches, 30. As best seen in FIG. 3, the notches 30 are arranged in an arc eccentric to the shaft 26. With this arrangement, as plate 25 pivots toward handle 24 one notch at a time moves into, and across, the plane of movement of the handle; each successive notch crossing the path of the handle at a point slightly further from shaft 26 than the preceding notch.

In operation, the weight of roller 22 will cause the belt tensioning device to pivot clockwise (FIG. 1) about stud 21, thus raising handle 24 completely above latch plate 25 unless the handle is engaged in one of the notches. When the operator moves the handle 24 downwardly to increase the tension of drive belt 16, the lower edge of handle 24 successively engages the surfaces 31 of notches 30 and cams plate 25 clockwise about shaft 26 as seen in FIG. 3. After the handle moves downwardly past any given notch, plate 25 moves back into the path of handle 24 under the influence of spring 28. In this manner, the handle 24 is automatically latched in the lowermost position to which the operator moves it.

It should be noted that with the notches 30 disposed eccentrically relative to the pivot axis of plate 25, and movable into the path of handle 24, more notches can be provided for in a given arc of movement of handle 24 than can be provided in the same space on a conventional fixedly mounted ratchet plate. This results in an apparatus capable of providing finer adjustability of the belt tension, as well as a rugged apparatus wherein the handle 24 need never be sprung out of its normal vertical plane of movement.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. A belt tightener comprising a yoke, a roller journalled in said yoke, means mounting said yoke for pivotal movement about an axis spaced from and extending generally transverse to said belt, a handle rigidly connected to said yoke for pivotal movement therewith about said axis, movement of said handle in one direction serving to move said roller into engagement with said belt and movement of said handle in the opposite direction serving to move said roller out of engagement with said belt, a latch plate mounted for pivotal movement about an axis adjacent and generally parallel to the plane of movement of said handle whereby portions of said plate may be moved into and out of the path of movement of said handle, said portions defining notches engageable with said handle to prevent movement thereof in said opposite direction.

2. A belt tightener comprising a roller, means supporting said roller for movement toward and away from a belt, said supporting means including a handle oscillatable through a predetermined arc in a fixed plane to move said roller into and out of engagement with said belt, a pivot member disposed adjacent the plane of movement of said handle and providing a pivot axis generally parallel to said plane, a latch member carried by said pivot member and oscillatable thereabout along an arc generally transverse to and intersecting the path of movement of said handle, means biasing said latch member into the path of movement of said handle, said latch member having a plurality of notches formed therein in position to engage said handle to prevent movement thereof in one direction.

3. A belt tightener for an endless belt entrained around a pair of spaced pulleys or the like and having reaches extending therebetween, said belt tightener comprising a pivot member spaced from and lying in a plane substantially parallel to one of said belt reaches, a roller supporting member mounted on said pivot member for oscillation thereabout toward and away from said one of the belt reaches, a roller journalled on said supporting member and engageable with said belt to increase the tension thereof when the supporting member is pivoted toward the belt, a handle mounted on said supporting member and oscillatable in a fixed plane to pivot the supporting member toward and away from said belt, a latch member having handle engageable portions thereon, means mounting said latch member for pivotal movement into and out of the path of movement of said handle about an axis generally parallel to the plane of movement of the handle whereby said handle engageable portions may be selectively positioned in engagement with said handle to prevent movement thereof in one direction.

4. A belt tightener as recited in claim 3 wherein said handle engageable portions are notches formed in said latch member and disposed eccentrically relative to the pivotal axis thereof whereby upon movement of the latch member in the direction toward said handle one notch at a time will cross the path of movement of said handle, each successive notch crossing said path of movement at a point farther from said pivotal axis than the preceding notch.

5. A belt tightener as recited in claim 4 wherein the means mounting said latch member comprises a pivot member extending substantially parallel to the plane of oscillation of said handle, means biasing said latch member into engagement with said handle and means on said latch member for moving the same out of the path of movement of said handle in opposition to said biasing means.

6. A belt tightener comprising a roller, means mounting said roller for pivotal movement about a fixed axis, a handle carried by said mounting means and being oscillatable through a predetermined arc to selectively move said roller into and out of engagement with a belt to vary the tension thereof, a pivot member disposed adjacent the arc of movement of said handle and providing a pivot axis generally perpendicular to said fixed axis, a latch member carried by said pivot member for swinging movement into and out of the arc of movement of said handle, said latch member having a handle engageable portion, means biasing said latch member into the arc of movement of said handle whereby said handle engageable portion engages the handle to prevent its movement in one direction past said latch member, and means on said latch member engageable by said handle upon movement thereof in the direction opposite said one direction for moving said latch member out of said arc of movement in opposition to said biasing means.

References Cited in the file of this patent

UNITED STATES PATENTS

| | | |
|---|---|---|
| 2,592,008 | Cherek | Apr. 8, 1952 |
| 2,929,262 | Felts | Mar. 22, 1960 |

FOREIGN PATENTS

| | | |
|---|---|---|
| 697,171 | Great Britain | Sept. 16, 1953 |